United States Patent [19]

Kato et al.

[11] Patent Number: 5,039,841
[45] Date of Patent: Aug. 13, 1991

[54] REFLOW FURNACE

[75] Inventors: Rikiya Kato, Soka; Naotake Mizoguchi, Hachioji; Kisaku Nakamura, Funabashi, all of Japan

[73] Assignee: Senju Metal Industry Co., Ltd., Tokyo, Japan

[21] Appl. No.: 246,487

[22] Filed: Sep. 12, 1988

[30] Foreign Application Priority Data

Sep. 11, 1987 [JP] Japan ................... 62-227858

[51] Int. Cl.$^5$ ........................... F27D 11/02
[52] U.S. Cl. .................. 219/388; 219/400; 392/40 T
[58] Field of Search ............. 219/388, 343, 400, 345, 219/405, 411, 390, 354; 34/210, 232, 224, 225, 4, 17

[56] References Cited

U.S. PATENT DOCUMENTS

| | | | |
|---|---|---|---|
| 3,393,532 | 7/1968 | Khoylian | 34/225 |
| 3,496,332 | 2/1970 | Lunde | 219/388 |
| 3,900,959 | 8/1975 | Breschi | 219/388 |
| 4,148,575 | 4/1979 | Siryj | 219/388 |
| 4,198,145 | 4/1980 | Scott | 219/388 |
| 4,416,618 | 11/1983 | Smith | 431/328 |
| 4,565,917 | 1/1986 | Furtek | 219/388 |
| 4,654,502 | 3/1987 | Furtek | 219/85 BM |
| 4,756,091 | 7/1988 | Van Denend | 219/388 |
| 4,833,301 | 5/1989 | Furtek | 219/388 |

FOREIGN PATENT DOCUMENTS 3429375 8/1984 Fed. Rep. of Germany .
63-128685 8/1988 Japan .

Primary Examiner—Teresa J. Walberg
Attorney, Agent, or Firm—Sughrue, Mion, Zinn, Macpeak & Seas

[57] ABSTRACT

A tunnel-type reflow furnace containing a preliminary heating zone and a main heating zone is disclosed. In the furnace, at least two pairs of infrared heaters are disposed on both the top and bottom of a tunnel providing a pathway for the transfer of an article to be heated, and the infrared heaters are of a gas blowing type. In a preferred embodiment, a gas-blowing nozzle that is freely adjustable in the direction of gas blowing is provided between infrared heaters on both the top and bottom of the tunnel. This furnace allows the heating profile to be easily changed in accordance with a specific use. It is also capable of efficient and uniform heating of a printed circuit board even if it carries many components at high density. As a result, the furnace ensures reliable soldering of the circuit board.

6 Claims, 5 Drawing Sheets

REFLOW FURNACE

BACKGROUND OF THE INVENTION

The present invention relates to a tunnel-type reflow furnace, in particular, to a cream solder melting tunnel-type reflow furnace which is furnished with a plurality of heaters on both the top and bottom of the tunnel and which consists of a preheating and a main heating zone. The term "cream solder" as used herein means a creamy substance that is formed by mixing solder in powder form and a liquid flux and which can be deposited in a given amount on selected locations by means of a screen printing apparatus or a dispenser. Such a "cream solder" has been extensively used in soldering electronic components to printed circuit boards.

A reflow furnace as an apparatus for soldering chip-mounting printed circuit boards has been known. Heating means for use in reflow furnaces include a hot gas, infrared radiation (both far and near infrared rays), and even the recently proposed technique of using the latent heat which is liberated when a gas undergoes a phase change to liquid.

In a reflow furnace, selected locations on a printed circuit board where cream solder has been applied are heated to the temperature at which the solder melts, thereby enabling electronic components of interest to be soldered to the circuit board. With modern printed circuit boards on which electronic components are to be mounted, heating of the circuit boards must be held to the necessary minimum level in order to minimize the thermal damage that might be caused to the electronic components. Therefore, an optimum heating pattern or profile does exist depending on the use of a specific printed circuit board.

Conventional reflow furnaces have their own heating profiles and the heating profile of a certain furnace is uniquely determined by its design parameters, namely, it lacks flexibility. The upper and lower limits of heating and cooling temperatures can be adjusted by some degree but time-dependent temperature control has been practically impossible.

With the increasing versatility of electronic components to be mounted on printed circuit boards, it has become desirable to heat circuit boards according to the optimal heating profile of each board. As for the heating of circuit boards themselves, the difference in temperature between the locations where soldering is to be effected and the other areas of the circuit board is preferably as small as possible. However, one is not advised to meet this requirement by simply heating the circuit board over a prolonged period since this will cause thermal damage to the electronic components mounted on the circuit board.

Another tendency in modern electronics industry is to manufacture even lighter and smaller electronic devices and this has increased the need to mount a number of electronic components on a small-area printed circuit board. In soldering printed circuit boards mounting components at high density, the solder applied to very small spaces between individual electronic components must be melted. If heating is performed with a conventional infrared heater, some of the closely packed electronic components will obstruct the travel of infrared radiation which goes on a straight line, and it often fails to travel far enough to reach desired locations where soldering is to be performed. The radiation emitted from a conventional infrared heater has a wavelength of no longer than 3 $\mu$m but such infrared rays are not effectively absorbed by a white substance such as solder to realize rapid heating. On the other hand, such infrared rays are rapidly absorbed by dark and sometimes black substances such as electronic components. Therefore, it has often occurred that only the electronic components are heated to high temperatures, with the solder remaining unmelted.

SUMMARY OF THE INVENTION

An object, therefore, of the present invention is to provide a soldering reflow furnace which allows the heating profile to be easily changed in accordance with a specific use.

Another object of the present invention is to provide a reflow furnace that is capable of efficient and uniform heating of a printed circuit board even if it carries many components at high density and which thereby ensures reliable soldering of the circuit board.

The present inventors conducted various studies in order to attain the objects set forth above, and found that using gas-blowing infrared heaters as heat sources in a tunnel-type reflow furnace is particularly preferred for the intended purposes. The present invention has been accomplished on the basis of this finding.

Infrared heaters are characterized in that the heating temperature is a function of the time for which irradiation is continued. Although infrared heaters are easy to handle, conventional types are not adapted for rapid heating. However, rapid heating can be accomplished easily with gas-blowing infrared heaters. An additional advantage of such gas-blowing infrared heaters is that they permit the construction of a tunnel-type reflow furnace that enables heating not only by infrared radiation but also by hot blowing the latent heat which is released when a gas-to-liquid phase change occurs.

With a view to ensuring more reliable temperature and atmosphere control not only in the preheating zone but also in the main heating zone, a gas blowing nozzle that is freely adjustable in the direction of gas blowing may be provided between infrared heaters. This offers the advantage of further improving the ability of a tunnel-type reflow furnace to adjust its heating profile, as well as to freely change the heating atmosphere.

Therefore, in one aspect, the present invention generally provides a tunnel-type reflow furnace comprising a preliminary heating zone and a main heating zone which is furnished with at least two pairs of infrared heaters disposed on both the top and bottom of a tunnel providing a pathway for the transfer of an article to be heated. Specifically, the infrared heaters are of a gas-blowing type.

Each of the gas-blowing infrared heater used in the present invention consists of an electric heater in a heater housing, a gas supply system for supplying a gas into the housing, and a gas-permeable ceramic heating surface disposed on the side of the housing which faces the article to be heated. An example of a useful gas-blowing infrared heater is described in the specification of commonly assigned Japanese Utility Model Application No. 20683/1987.

In another aspect, the present invention generally provides a tunnel-type reflow furnace comprising a preliminary heating zone and a main heating zone which is furnished with at least two pairs of infrared heaters disposed on both the top and bottom of a tunnel providing a pathway for the transfer of an article to be heated. Specifically, the infrared heaters are of a gas blowing type and a gas-blowing nozzle that is freely adjustable in the direction of gas blowing is provided between infrared heaters on both the top and bottom of the tunnel. At least one pair of gas-blowing nozzles are disposed on both the top and bottom of the tunnel. More preferably, one pair of such nozzles are disposed in each of the spaces between locations where adjacent infrared heaters are installed. Since each of these nozzles permits free adjustment of the direction in which a gas is to be blown, a gas stream in each of the heating regions defined by paired infrared heaters can be adjusted to flow either concurrently or countercurrently with respect to the printed circuit board.

As described above, each of the infrared heaters employed in the present invention provides a porous surface through which infrared radiation is emitted; at the same time, this surface allows the gas heated with internal heaters to be released as a hot gas to the outside of the heaters. Because of these features, the infrared heaters specifically used in the present invention can easily accomplish uniform heating of printed circuit boards which have been difficult to heat uniformly with conventional infrared heaters. If gas-blowing nozzles are used in combination with the gas-blowing infrared heaters described above, heat convection develops within the furnace and enables an article of interest to be heated uniformly with a hot gas. This helps provide an even more uniform temperature distribution, thereby eliminating the need to heat the article in the furnace to a temperature that is excessively higher than the set value.

DETAILED DESCRIPTION OF THE INVENTION

A reflow furnace according to one embodiment of the present invention is described below in detail with reference to the accompanying drawings.

Figure 1:
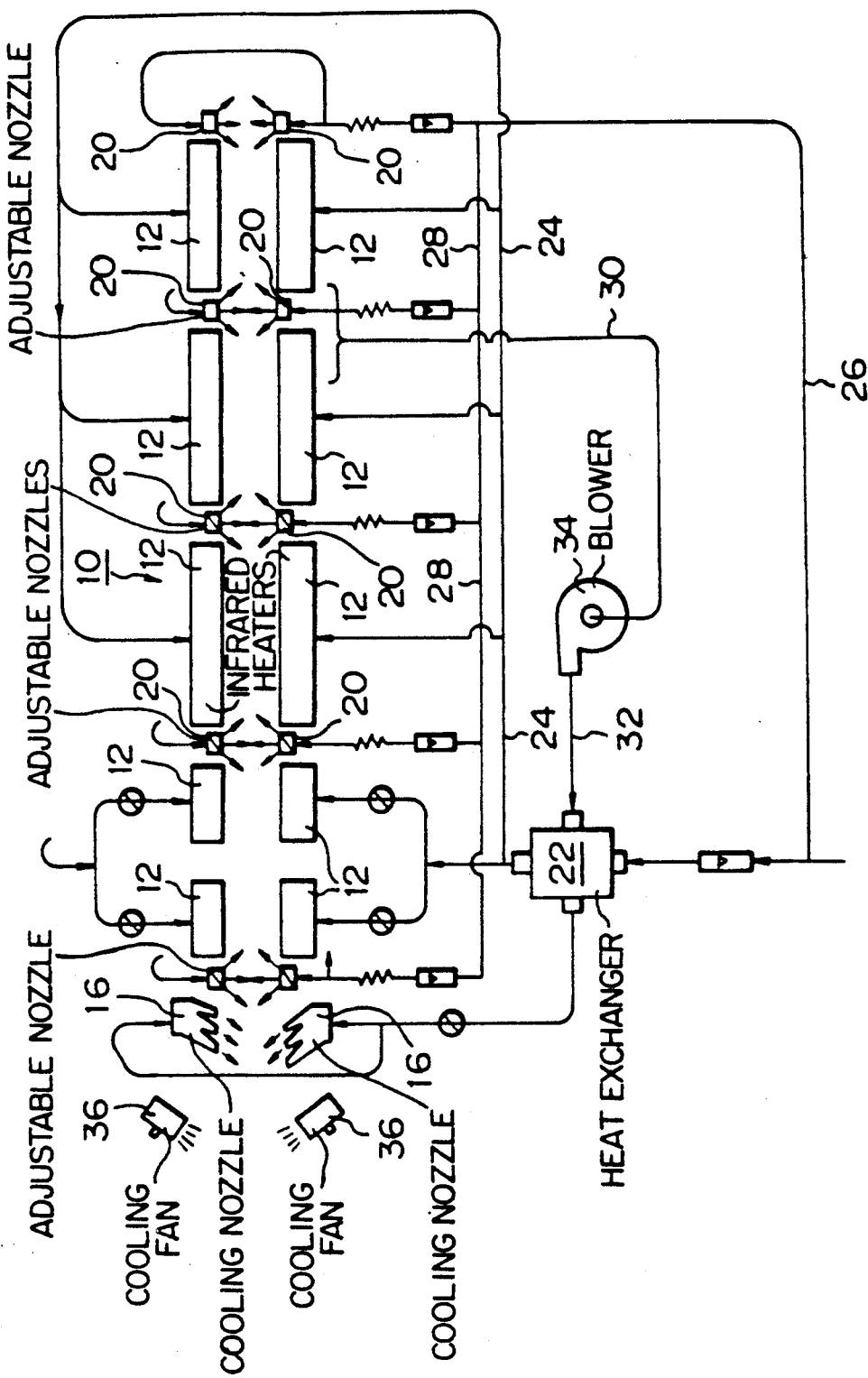
FIG. 1 is a schematic diagram of a reflow furnace according to one embodiment of the present invention.

FIG. 1 is a schematic diagram of the reflow furnace generally indicated by 10. As shown, the reflow furnace 10 comprises at least two pairs of infrared heaters 12 that are disposed on both the top and bottom of a tunnel consisting of a preliminary heating zone and a main heating zone. Cooling nozzles 16 are provided at the exit end of the main heating zone for the purpose of cooling the printed circuit (not shown) on which soldering has been completed.

In the embodiment shown, nozzles 20 which are freely adjustable to determine the direction of gas blowing are provided between infrared heaters on both top and bottom of the tunnel.

A gas which is preferably nitrogen is blown into the reflow furnace in the following way. Nitrogen gas from a suitable source of supply (not shown) is passed through a heat exchanger 22 and fed as a blow gas into each of the infrared heaters 12 via a line 24. Nitrogen gas flowing through a line 26 is divided to flow into a line 28 and is thence sent to the nozzle 20 between heaters, from which it is injected into the furnace. The gas blowing out of the space between adjacent heaters is recovered through a line 30 and supplied to the cooling nozzles 16 past a line 32 and a blower 34. In the embodiment shown, gas blowing nozzles are also provided both behind the first infrared heater in the preliminary heating zone and ahead of the last heater in the main heating zone. Cooling fans are indicated by 36.

It should be noted that FIG. 1 is given here for illustrative purposes only and that all of the heaters and nozzles are assembled in the interior of the furnace which is generally composed of a tunnel-shaped heat-insulating material. The central region of the furnace provides a pathway through which printed circuit boards are to be transferred and is furnished with a transport mechanism such as an endless belt (or chain). However, the construction of the furnace and the transport mechanism that can be employed in the present invention may be of any conventional type and are in no way limited. Therefore, a detailed description of these factors is omitted for the sake of simplicity.

Figure 2:
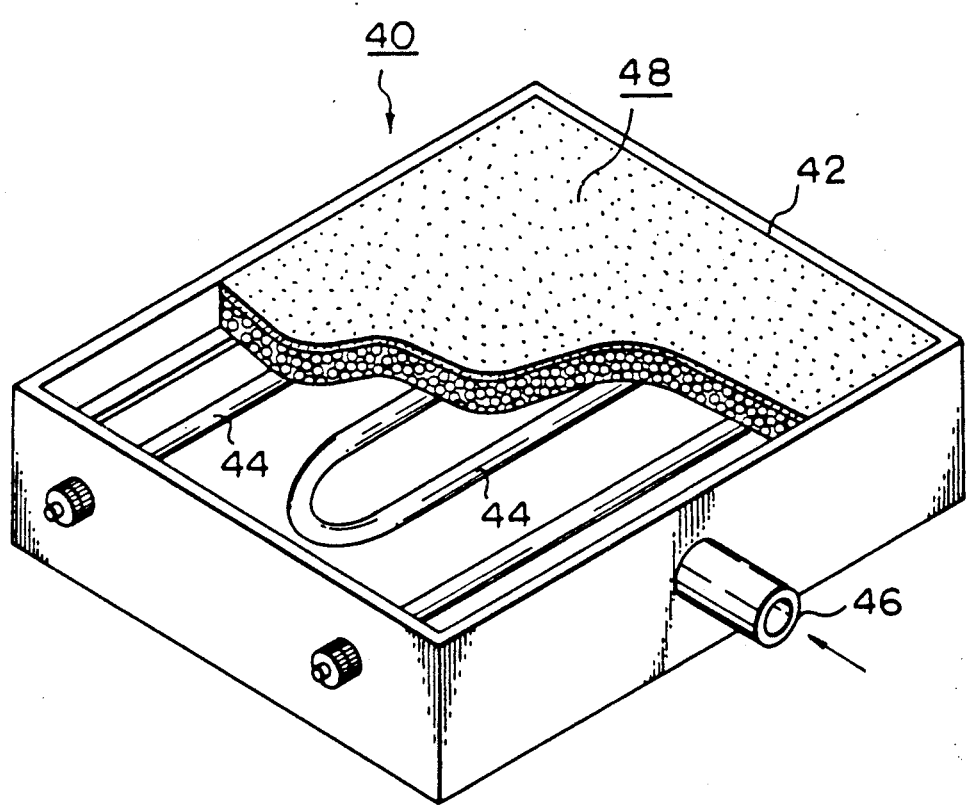
FIG. 2 is a perspective sketch of the gas-blowing infrared heater for use in the present invention.

FIG. 2 is a perspective sketch of the gas-blowing infrared heater useful in the present invention. As shown, the gas-blowing infrared heater generally indicated by 40 consists of a heater housing 42, an electric heater 44 placed in this housing, a gas inlet 46 as part of a system for supplying a gas such as nitrogen or air into the housing 42, and a gas-permeable ceramic heating surface 48 disposed on the side of the housing 42 which faces an article to be heated, or on the side where it faces the above-described pathway of transfer. Pairs of such gas-blowing infrared heaters are provided in the interior of the furnace on both the top and bottom thereof in such a way that they are directed to a printed circuit board to be heated. Infrared heaters themselves are known in the art and will not need any further explanation, except that infrared heaters of the gas blowing type which are to be used in the present invention make use of infrared, typically far infrared, rays emitted from the ceramic material heated with the electric heater 44 and that the gas permeability of the ceramic heating surface is utilized in such a way that the gas supplied through the inlet 46 is heated with the electric heater and thereafter released from said heating surface. Because of this additional effect of hot gas blowing, the present invention is capable of realizing uniform heating of printed circuit boards carrying components at high density. There is no particular limitation on the material or other factors of the gas-permeable ceramic heating surface 48 and it may be of any type that is capable of exhibiting the operational advantages described above. Preferably, the surface 48 is formed by thermal-spraying a ceramic material such as $Al_2O_3$ or $TiO_2$ on a porous metal sheet serving as a support which is prepared by electroforming.

The heating profile that is obtained in practice when the tunnel-type reflow furnace of the present invention is operated is described below. Firstly, a printed circuit board carrying electronic components which enters the tunnel at the right end (as viewed in FIG. 1) is successively passed between the first, second and third pairs of infrared heaters in the preheating zone. The specifications of the heaters 12 and other parameters thereof are summarized in Table 1 below. The circuit board is transferred at a rate of 0.6 m/min.

TABLE 1

| Infrared heaters: | |
|---|---|
| Gas-permeable ceramic heating surface: | Ni—Cr porous metal sheet (3 mm thick) prepared by electroforming |
| Ceramic layer: | thermal sprayed $Al_2O_3$ layer (0.05 mm thick) |
| Capacity: | 2.4 kW (preheating zone) 1.2 kW (main heating zone) |
| Dimensions of heating surface: | 460 mm × 480 mm (preheating zone) 230 mm × 480 mm (main heating zone) |
| Gas to be blown: | $N_2$ (35 $Nm^3$/min) |
| Gas-blowing nozzle: | |
| Blowing capacity: | 7 $Nm^3$/min |
| Gas to be blown: | $N_2$ |
| Gas temperature: | 50° C. |
| Blowing direction: | concurrent (preheating zone) countercurrent (main heating zone) |

Figure 3:
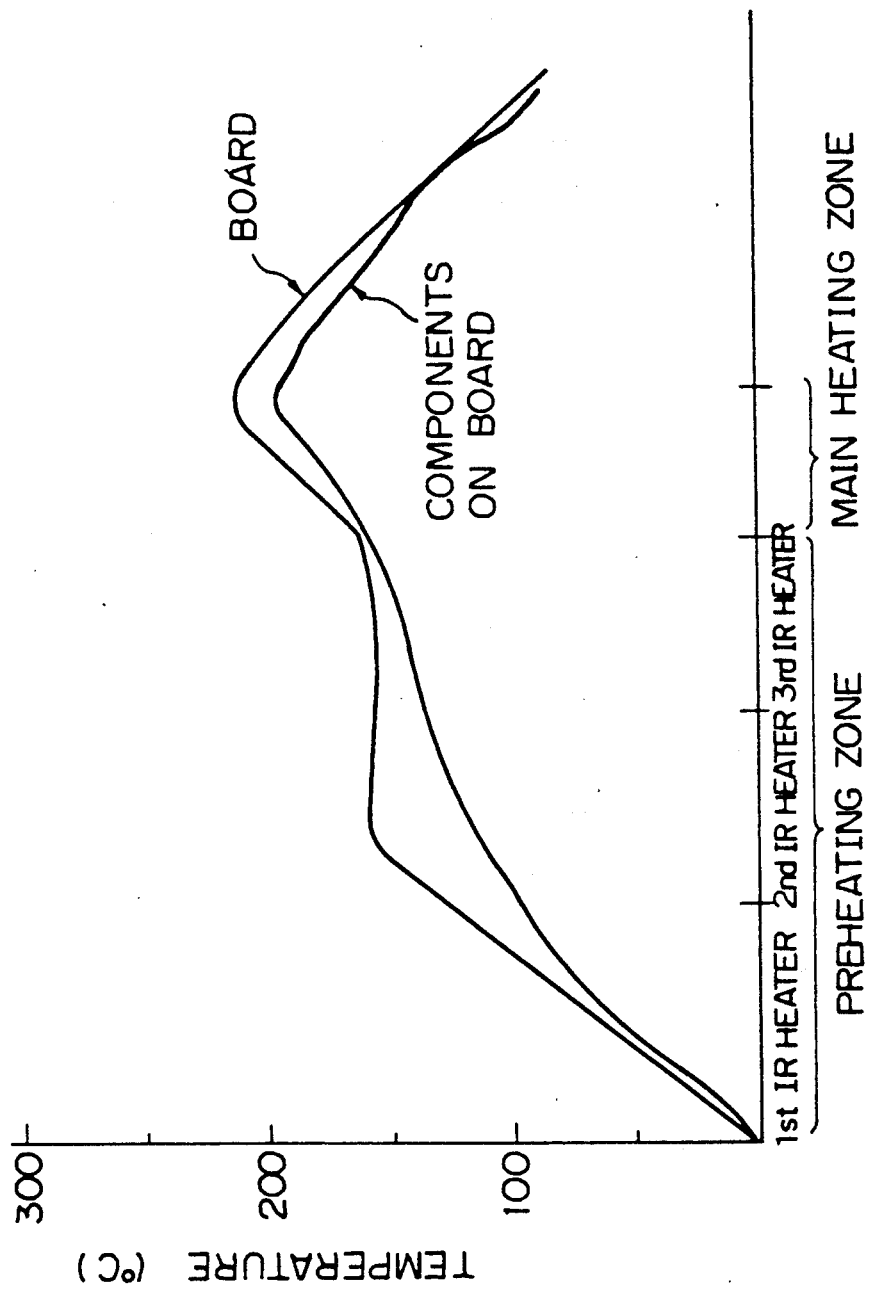
FIG. 3 is a graph showing a typical heating profile that can be obtained with the reflow furnace of the present invention.

The heating pattern obtained under the conditions set forth above is as shown in FIG. 3. The circuit board is heated to about 150° C. in the region covered by the first infrared heater.

Thereafter, the board is heated at a comparatively slow rate so as to minimize the temperature difference that will occur between the board and components mounted on it. The step of preliminating heating is completed at approximately 150° C. The temperature and atmosphere for the preliminary heating can be freely altered by changing the temperature, type and direction of the gas injected through nozzles 20.

Because of the use of gas-blowing infrared heaters, the temperature developed in the preliminary heating zone is sufficient to heat the surface of the circuit board, thereby ensuring uniform heating over the entire part of the board.

The printed circuit board emerging from the preliminary heating zone enters the main heating zone where it is rapidly heated to a predetermined temperature, say 200° C., at which solder is melted to join a specific component to the board.

After completion of the soldering operation, the board is cooled to about 130° C. with cooling nozzles 16 and is finally cooled with fans 36 to 25° C. which is close to room temperature.

Figure 4:
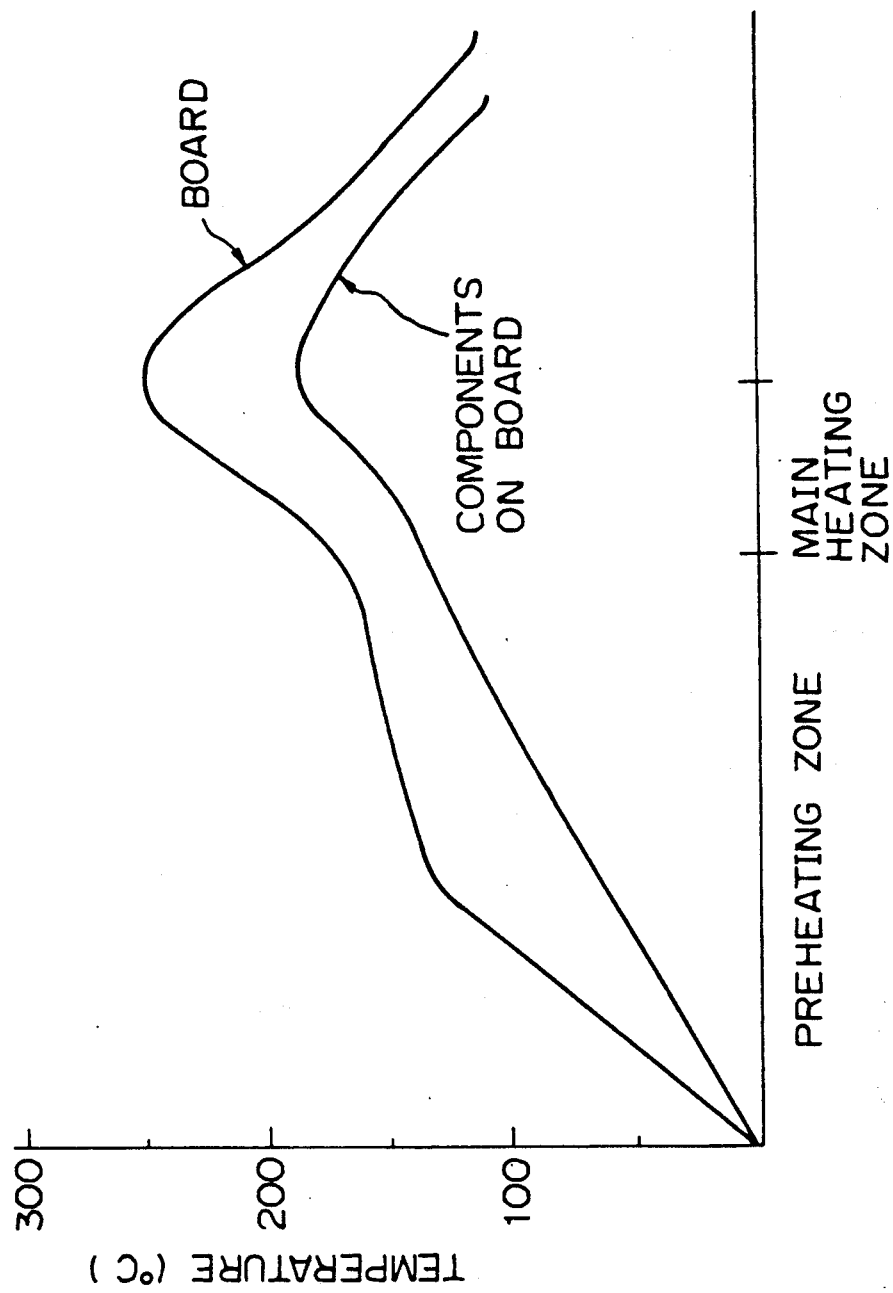
FIGS. 4 and 5 are graphs showing the heating profiles obtained with two prior art reflow furnaces.

As a comparison, the same experiment was conducted with a reflow furnace of the same size using conventional (non-gas-blowing) infrared heaters. The heating profile obtained with this furnace is shown in FIG. 4. In the comparative experiment, no gas was blown through nozzles between individual heaters. As one can see from FIG. 4, the temperature difference between the circuit board and components mounted on it did not decrease in any significant amount even when the board was passed through the main heating zone.

Figure 5:
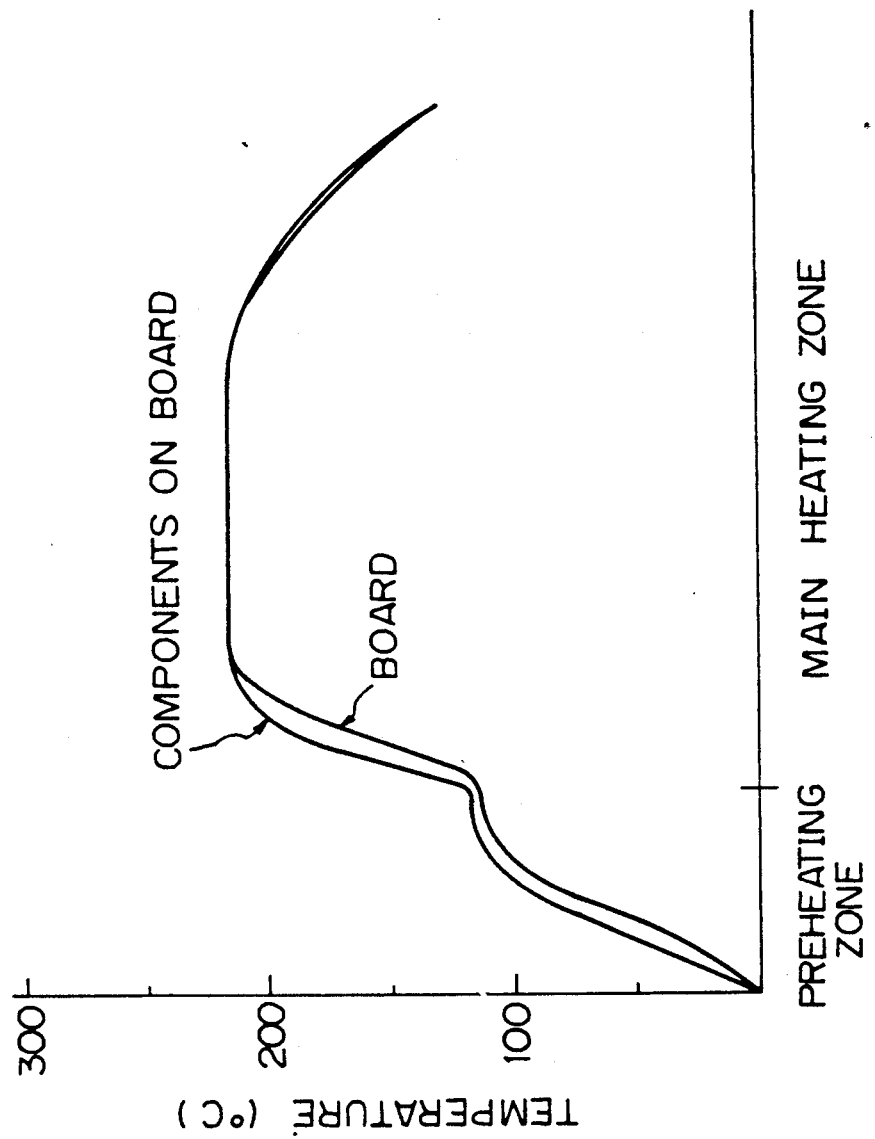

FIG. 5 shows diagrammatically the heating profile obtained with a reflow furnace that utilizes the latent heat released in a gas-to-liquid phase change. One can clearly see that this profile is substantially the same as what is obtained in the present invention.

As will be understood from the foregoing discussion, the reflow furnace of the present invention provides a sufficiently great degree of operational flexibility to produce an appropriate heating profile which best suits the specific heating characteristics required of diverse printed circuit boards. This furnace offers a particularly notable advantage in commercial operations in that it meets all of the specifications currently required in the heating of printed circuit boards. Since gas-blowing infrared heaters are employed in the preliminary heating zone, the reflow furnace of the present invention enables uniform "soft blowing" and hence is particularly effective in soldering printed circuit boards carrying electronic components at high density.

What is claimed is:

1. A tunnel-type cream solder melting reflow furnace comprising a preliminary heating zone and a main heating zone which is furnished with at least two pairs of infrared heaters disposed on both a top and bottom of a tunnel providing a pathway for transfer of a printed circuit board carrying electronic components to be heated, said infrared heaters being of a gas-blowing type, each comprising an electric heater in a heater housing, a gas supply system for supplying a gas into the housing, and a gas-permeable ceramic heating surface disposed on the side of the housing which faces the printed circuit board to be heated.

2. A tunnel-tye cream solder melting reflow furnace according to claim 1 wherein the gas blown from the nozzle is nitrogen gas.

3. A tunnel-type cream solder melting reflow furnace according to claim 1 wherein the infrared heaters are far-infrared heaters.

4. A tunnel-type cream solder melting reflow furnace comprising a preliminary heating zone and a main heating zone which is furnished with at least two pairs of infrared heaters disposed on both a top and bottom of a tunnel providing a pathway for the transfer of a printed circuit board carrying electronic components to be heated, said infrared heaters being of a gas-blowing type, each comprising an electric heater in a heater housing, a gas supply system for supplying a gas into the housing, and a gas-permeable ceramic heating surface disposed on the side of the housing which faces the printed circuit board to be heated and a gas-blowing nozzle that is freely adjustable to determine the direction of gas blowing being provided between infrared heaters on both the top and bottom of the tunnel.

5. A tunnel-type cream solder melting reflow furnace according to claim 4 wherein the gas blown from the nozzle is nitrogen gas.

6. A tunnel-type cream solder melting reflow furnace according to claim 4 wherein the infrared heaters are far-infrared heaters.

* * * * *